No. 730,491. PATENTED JUNE 9, 1903.
J. THOMSON.
APPARATUS FOR MEASURING LEATHER.
APPLICATION FILED DEC. 13, 1902.
NO MODEL. 3 SHEETS—SHEET 1.

Witnesses
Anna R. McCole
Catherine Allen

Inventor
Julius Thomson.

By his attorney
Edward P. Thompson

No. 730,491. PATENTED JUNE 9, 1903.
J. THOMSON.
APPARATUS FOR MEASURING LEATHER.
APPLICATION FILED DEC. 13, 1902.
NO MODEL. 3 SHEETS—SHEET 2.

Witnesses
Anna R. McBride
Catherine C. Cullen

Inventor
Julius Thomson

By his attorney
Edward P. Thompson

No. 730,491. PATENTED JUNE 9, 1903.
J. THOMSON.
APPARATUS FOR MEASURING LEATHER.
APPLICATION FILED DEC. 13, 1902.
NO MODEL. 3 SHEETS—SHEET 3.

Witnesses
Anna R. McCole
W. A. Kelly

Inventor
Julius Thomson

By his attorney
Edward P. Thompson

No. 730,491.

Patented June 9, 1903.

UNITED STATES PATENT OFFICE.

JULIUS THOMSON, OF OFFENBACH-ON-THE-MAIN, GERMANY.

APPARATUS FOR MEASURING LEATHER.

SPECIFICATION forming part of Letters Patent No. 730,491, dated June 9, 1903.

Application filed December 13, 1902. Serial No. 135,092. (No model.)

*To all whom it may concern:*

Be it known that I, JULIUS THOMSON, manufacturer, a subject of the Emperor of Germany, residing in Offenbach-on-the-Main, in the Empire of Germany, (whose full postal address is 23 Domstrasse, Offenbach-on-the-Main, aforesaid,) have invented certain new and useful Improvements in Apparatus for Measuring Leather, for which application has been made in Germany, October 18, 1902; in England, November 1, 1902; in France, November 3, 1902, and in Belgium, November 13, 1902.

This invention has for its object a measuring apparatus for hides, leather, and the like, which not only is extremely simple in all its parts, but also and more particularly is absolutely certain in its action.

The principle of this improved measuring apparatus consists in a given number of electric contact-plates being arranged at equal distances apart on a roller of definitely-known superficial area, which plates on the rotation of the roller come in contact with movable keys arranged at definite intervals, by which means currents are conveyed to electromagnets, which in turn attract their armatures, the displacement of these being indicated by a recording or indicating mechanism. On the passage of the leather the keys are prevented from resting on the contacts on the roller at every point where leather is passing.

An apparatus arranged on this principle is shown in the accompanying drawings, in which—

Figure 1:
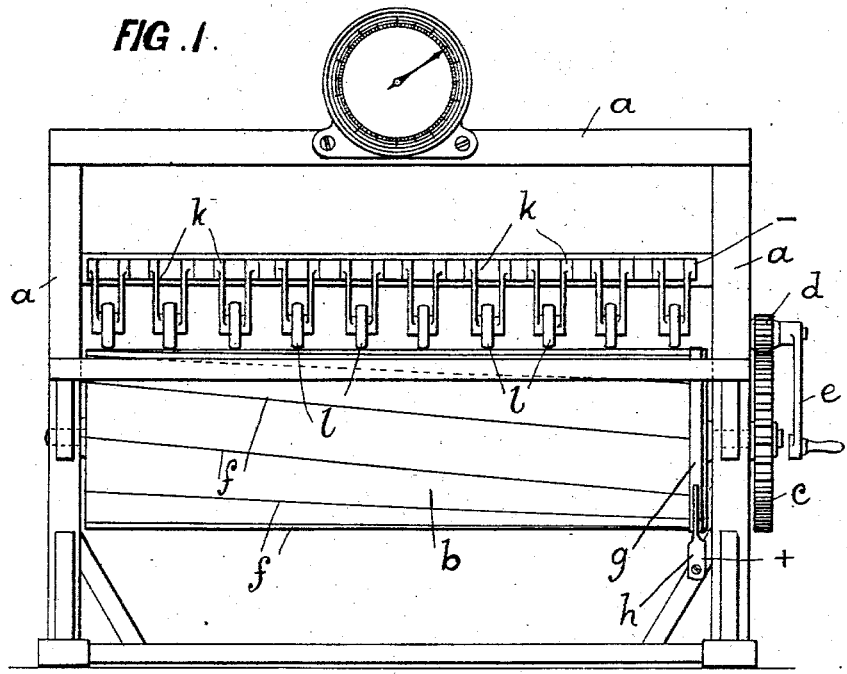
Figure 2:
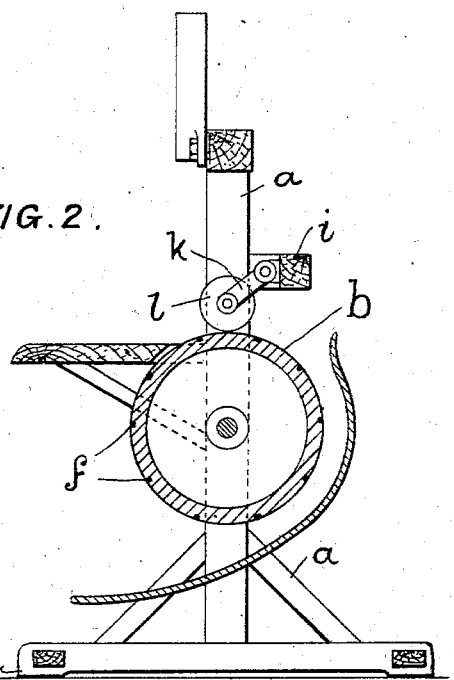
Figure 3:
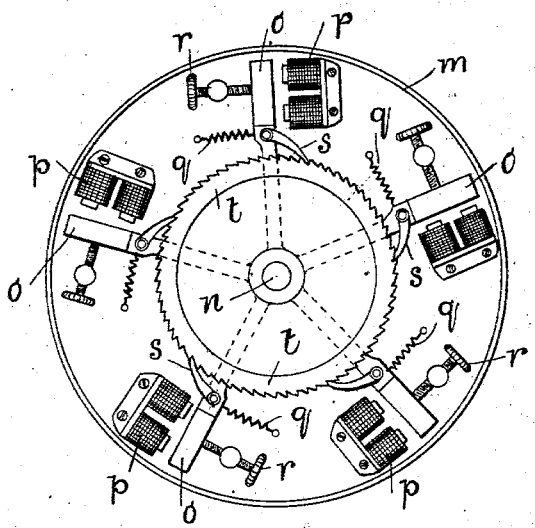
Figure 5:
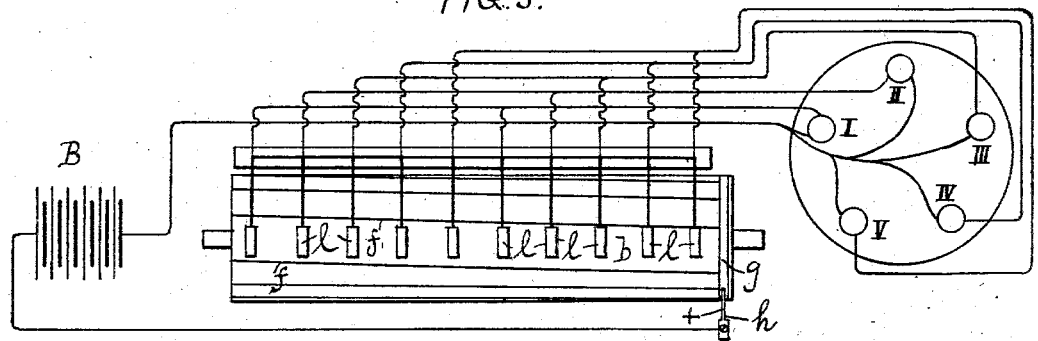
Figure 7:
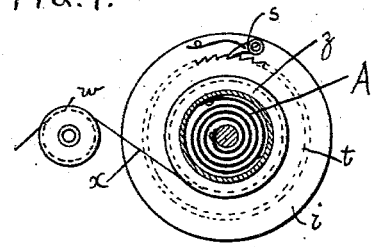
Figure 8:
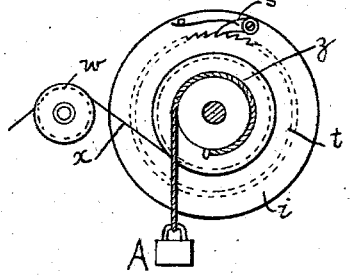
Figure 6:
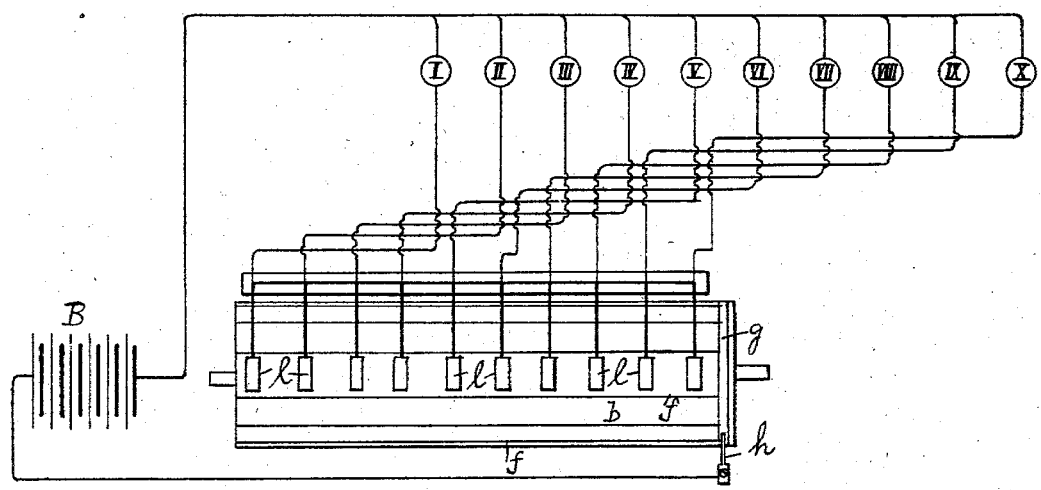

Figure 1 is a front view of the measuring apparatus; Fig. 2, a cross-section, and Figs. 3 and 4 two modified forms of construction of the operating mechanism for the indicating device. Figs. 5 and 6 are diagrams of the circuit and electrical apparatus, with an outline of some of the other parts. Fig. 7 shows the application of the spring, and Fig. 8 shows the upper casing of a weight.

A roller $b$ is mounted in a frame $a$ and is rotated by means of cog-wheels $c\ d$ from a crank $e$ or by any other suitable known means. A given number (preferably ten) of fine metal strips $f$ are arranged on the roller $b$ at exactly uniform distances apart. They all run to a metal ring $g$, mounted on one end of the roller, which is in communication with a source of electricity by means of a rubbing spring $h$. A support $i$ is also mounted on the rear of the frame $a$. On this support $i$ are a suitable number of keys, which consist of movable arms $k$ and rollers $l$, the distances apart of which correspond exactly to the distances of the contact-bars $f$ on the roller $b$. At the head of the machine a counting mechanism is fixed. This consists of a casing $m$, in the center of which is a shaft $n$. On this shaft a number (preferably five) of pivoting-arms $o$ are loosely mounted, the outer ends of said arms being formed as armatures for electromagnets $p$, which rest upon contact-screws $r$ under the pressure of springs $q$. As soon as one of the magnets $p$ receives current it attracts its armature $o$, while a pawl or catch tooth $s$, mounted on the said armature, moves forward a ratchet-wheel $t$, thus moving the indicating-pointer.

The electromagnets $p$ are so connected with the keys $l$ that they come into operation under all circumstances no matter whether only one of the keys or several or even all of them are simultaneously operated—that is to say, when the roller is running quite empty. If one magnet be provided for several keys together, as is the case in the arrangement shown in Fig. 3, for each two magnets, it is necessary that the contact-strips $f$ shall not lie parallel to the axis of the roller $b$ but obliquely, thus running in slightly spiral lines, so that the same contact-strip imparts two or more impulses to one electromagnet in each rotation. A separate magnet may, however, be provided for each key, in which case the strips on the roller $b$ are parallel to the axis and the pointer is moved by the pawl-and-ratchet devices through a distance corresponding to the sum of the impulses caused by the current in each electromagnet receiving current.

It is now evident that as soon as a piece of leather is laid on the roller $b$ and the latter is then rotated the keys $l$ are lifted up by the leather so far as it covers the surface of the roller, whereby contact with the strips $f$ is broken; but wherever the roller remains uncovered the keys will each time encounter the respective strips, and thereby set in operation the magnets and indicating mechanism. The pointer will then exactly indicate how large the piece of leather is, if it indicates on one side on a scale, with divisions for a hundred square units, how much is wanting and on the other side how much there is.

Figure 4:
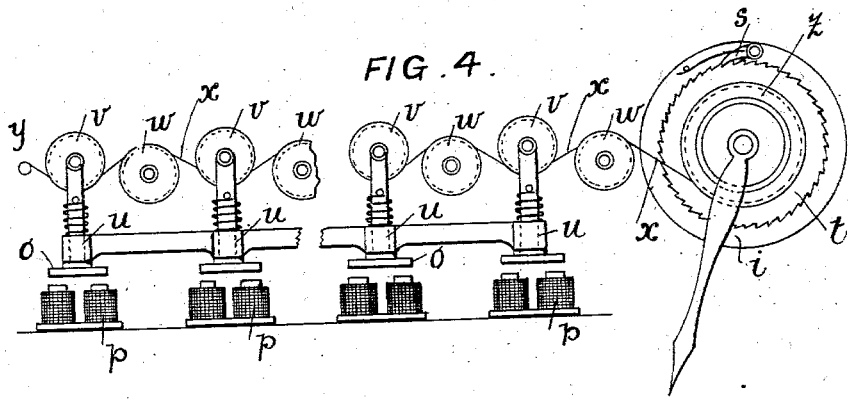

Fig. 4 shows another form of construction of the arrangement for operating the indicating mechanism. Here magnets $p$ move armatures $o$, which are adjustably located in fixed guides $u$ and on the free ends of which small spring-rollers $v$ are mounted. Between each two of these rollers $v$ a fixed roller $w$ is mounted. A string $x$ runs from a pin $y$ alternately to one side and the other over all these rollers $v$ and $w$, and its other end is fixed to a wheel $z$, connected with the ratchet-wheel $t$, which wheel $z$ stretches the string $x$ by means of a weight $a$ or spring $a'$. As soon as one or more or all the magnets attract their armatures the string $x$ is more or less stretched and draws the wheel $z$ with the ratchet $t$ forward and at the same time pushes the wheel $l$ farther around and the latter operates the pointer.

In Figs. 1 and 5 the strips $f$ are oblique to the axis of the roller $b$, while in Fig. 6 they are parallel. B represents the battery for the electric circuits. I II III IV, &c., indicate the circles for representing the location of the magnets $p$.

I declare that what I claim is—

1. In an apparatus for measuring hides, leather and the like, the combination of a roller, a plurality of contact-strips on the surface of said roller, a plurality of contact-keys, means for supporting said contact keys in such manner that they are normally in contact with the roller-surface, an indicator and electric means under the control of said keys for operating the indicator whereby whenever the keys are allowed to come in contact with the roller and its contact-strips the indicator is moved.

2. In an apparatus for measuring hides, leather and the like, the combination of means for feeding the articles to be measured, a plurality of contact-strips on said means, a plurality of contact-keys adapted to make contact with said strips, and an indicator under the control of said keys, whereby when the keys touch the strips a current is allowed to pass and the indicator is moved.

3. In an apparatus for measuring hides, leather and the like, the combination with a feeding device, and a plurality of electric contact devices connected therewith, of an indicator, a plurality of electromagnets, electric connections between said electromagnets and the contact devices, a plurality of armatures and means under the control of each armature for moving the indicator, whereby when a current is allowed to pass by one or more of the contact devices one or more of the electromagnets are operated and the indicator is moved correspondingly.

4. In an apparatus for measuring hides, leather and the like, the combination of a feeding device, a plurality of contact devices in connection therewith, a plurality of electromagnets under the control of said contact devices, a plurality of armatures, an indicator, a string fixed at one end and connected at the other with the drum of the indicator, and means connected to each armature for engaging with the spring, whereby the indicator is moved, when the armatures are attracted to the electromagnets, and whereby the string is less displaced and a smaller movement is imparted to the indicator when some of the contacts are broken and some of the electromagnets are left out of action on the passage of a sheet to be measured.

In witness whereof I have hereunto signed my name, this 24th day of November, 1902, in the presence of two subscribing witnesses.

JULIUS THOMSON.

Witnesses:
JEAN GRUND,
CARL GRUND.